F. O. LAKE.
GREEN CORN CUTTING AND SCRAPING IMPLEMENT.
APPLICATION FILED JULY 27, 1916.
1,224,474.
Patented May 1, 1917.
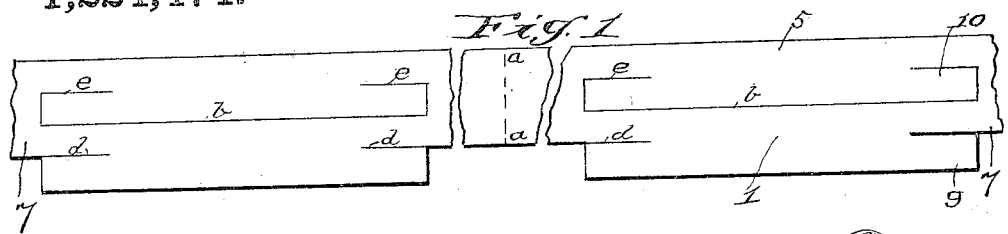
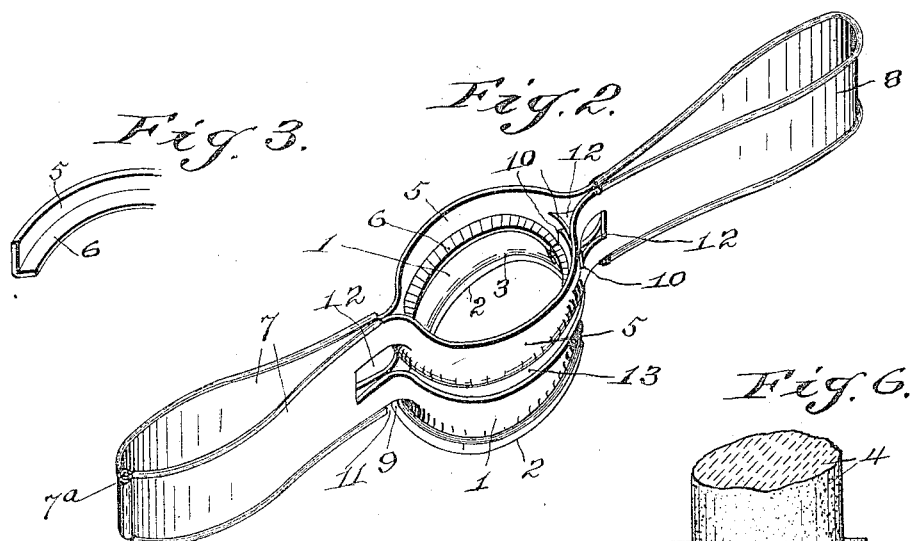
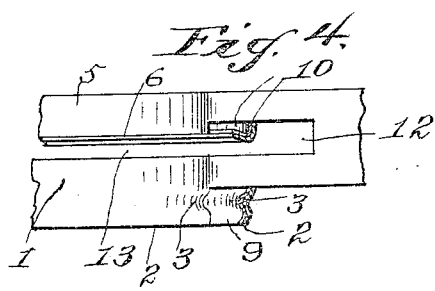
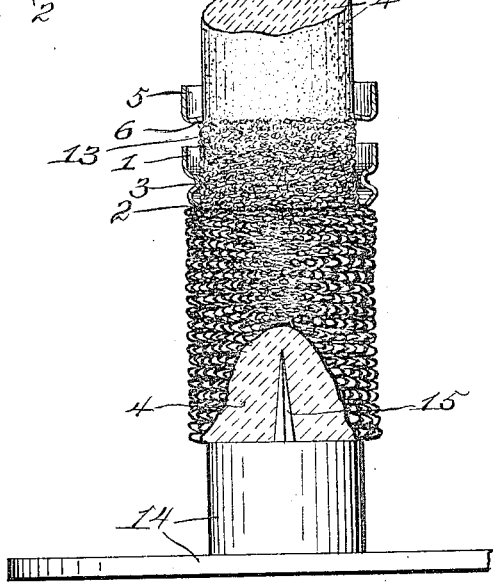
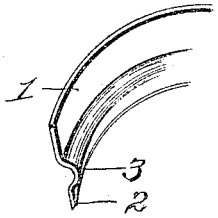
Inventor
Fred O. Lake
By C. T. Belt
Attorney

UNITED STATES PATENT OFFICE.

FRED O. LAKE, OF WASHINGTON, DISTRICT OF COLUMBIA.

GREEN-CORN CUTTING AND SCRAPING IMPLEMENT.

1,224,474.     Specification of Letters Patent.     Patented May 1, 1917.

Application filed July 27, 1916. Serial No. 111,654.

*To all whom it may concern:*

Be it known that I, FRED O. LAKE, a citizen of the United States, residing at Washington, in the District of Columbia, have invented certain new and useful Improvements in Green-Corn Cutting and Scraping Implements, of which the following is a specification.

This invention relates to devices for removing green corn from cobs, and pertains especially to an implement for cutting green corn from the cob, and for scraping and removing the corn hearts from the cobs simultaneously with the cutting, so as to render the cobs free of the grains and of the hearts of the grains, and so as to render the corn in proper and desirable condition for food purposes. One of the essential features of the invention is to furnish in one and the same device or implement, a peculiar cutter having a cutter guard followed by a scraper. Another feature of the invention is to furnish a hand implement provided with a pair of hand-grasping resilient members, having a cutter, and a scraper interposed between and controlled by said handle members.

The utility and advantages of the implement in removing and preserving all the food products of the corn will be fully understood from the following description taken in connection with the drawings, in which:—

Figure 1, is a plan view of a metal plate die-stamped or cut out preparatory to forming the implement and partly broken away.

Fig. 2, is a perspective view of the implement as in cutting position.

Fig. 3, is a detail perspective view of part of the scraper.

Fig. 4, is a sectional view of certain of the overlapped extensions. Fig. 5 is a detail perspective view of part of a cutter and guard.

Fig. 6, is an enlarged sectional view of the implement applied to an ear of corn, showing the latter as partly cut and scraped.

The same references and characters denote the same parts throughout the several views of the drawings.

The implement is preferably die-stamped out of a single piece of sheet metal bendable crosswise centrally on the dotted line *a—a*, and having central longitudinal slits *b*, edge slits *d*, and similar slits *e*, so that the blank affords a pair of duplicate portions separated for part of their length by the slits *b*, and capable of being bent into two pairs of semicircular members, hereinafter more particularly referred to.

One pair of members 1, have a knife or cutting edge 2, and a knife guard 3, pressed inwardly above the knife edge so as to prevent the knife from cutting the cob 4, in a downward stroke of the implement for cutting green corn from the cob. The other pair of members 5, have a scraper 6 for removing the heart of the grains from the cob following the downward movement of the implement in a corn cutting operation. One end of the said members 1 and 5, has a handle projection 7, and these projections are fastened as at 7ª. The other ends of said members are connected by a spring loop 8, which also forms a handle projection. The knife members are provided with over-lapping knife extensions 9, having the guard 3 extending throughout and the scraper member is provided with similar overlapping scraper extensions 10, having the scraper extending throughout. The extensions 9 work through cutouts 11, and the extensions 10, work through slots 12. The opening 13 between the members 1 and 5 forms an exit for the scraped products.

In order to support an ear of corn in vertical position for cutting, I provide a support such as a block 14, having a central cob-piercing point or prong 15.

It will be understood that the spring of the handle members is sufficient to hold the members 1 and 5 for a cutting and scraping operation, and that the bearing or relative movement of the members 1 and 5 is controlled by the handle members, so that the members 1 and 5 are self-adjusting according to the size of the ear.

In the application of the implement it will be seen that the grains are cut off so as to leave the hearts thereof, that the guard prevents the knife from biting or cutting into the cob, that the scraper is of such character as to remove the heart of the grains or any other food product from the cob which may remain on the cob after cutting, and that the cutter and scraper are operated to follow each other for simultaneous operation by one and the same downward thrust of the implement over an ear of corn, for cleanly stripping the cob.

I do not wish to be understood as confining the invention to any particular size or material, nor to any particular shape of the guard or of the scraper. Neither do I wish to limit myself in the manufacture of the implement in one piece, but reserve the right to make such changes and variations therein as may come within the scope of the appended claims.

Having thus described my invention, what I claim as new and desire to secure by Letters Patent, is:—

1. A corn cutting implement comprising a pair of resilient circular cutters each having an inwardly projecting guard, and spring looped handles connecting and projecting from the cutters for controlling the circular movement of the cutters.

2. An implement of the character described, comprising a pair of resilient circular cutters, each provided with an inwardly projecting guard, a pair of resilient circular scrapers, and resilient handles connecting the cutters and the scrapers and controlling the circular movement of the cutters and the scrapers and for operating the implement in a cutting and scraping operation.

3. A corn cutting and scraping implement composed of a single piece of metal and comprising a pair of resilient handle members, a pair of circular resilient cutters between and connected by the handle members and having over-lapping portions struck from the handle members, and a pair of circular resilient scrapers between and connected by the handle members and having over-lapping portions struck from said members.

4. An implement for removing green corn from cobs, comprising circular cutting members, each provided with an inwardly projecting guard, scraping members adjacent to the cutting members and having a scraping edge projecting inwardly above the guards, and resilient handle members connecting the cutting and scraping members.

5. An implement for removing green corn from cobs, comprising circular cutting members, circular scraping members, a resilient handle portion connecting one end of the cutting and scraping members, a resilient handle portion connecting the other end of these members, and over-lapping projections struck out of the handle portions and projecting from the ends of each of said members.

6. An implement for cutting and scraping green corn from cobs, comprising circular cutting members, each provided with an inwardly projecting guard, circular scraping members having an inturned scraping edge above the guards and separated from the latter by an exit opening, and handle members projecting from the cutting and scraping members.

In witness whereof I hereunto set my hand in the presence of two witnesses.

FRED O. LAKE.

Witnesses:
C. F. BELT,
R. F. LANSDALE.

Copies of this patent may be obtained for five cents each, by addressing the "Commissioner of Patents, Washington, D. C."